Patented Feb. 5, 1952

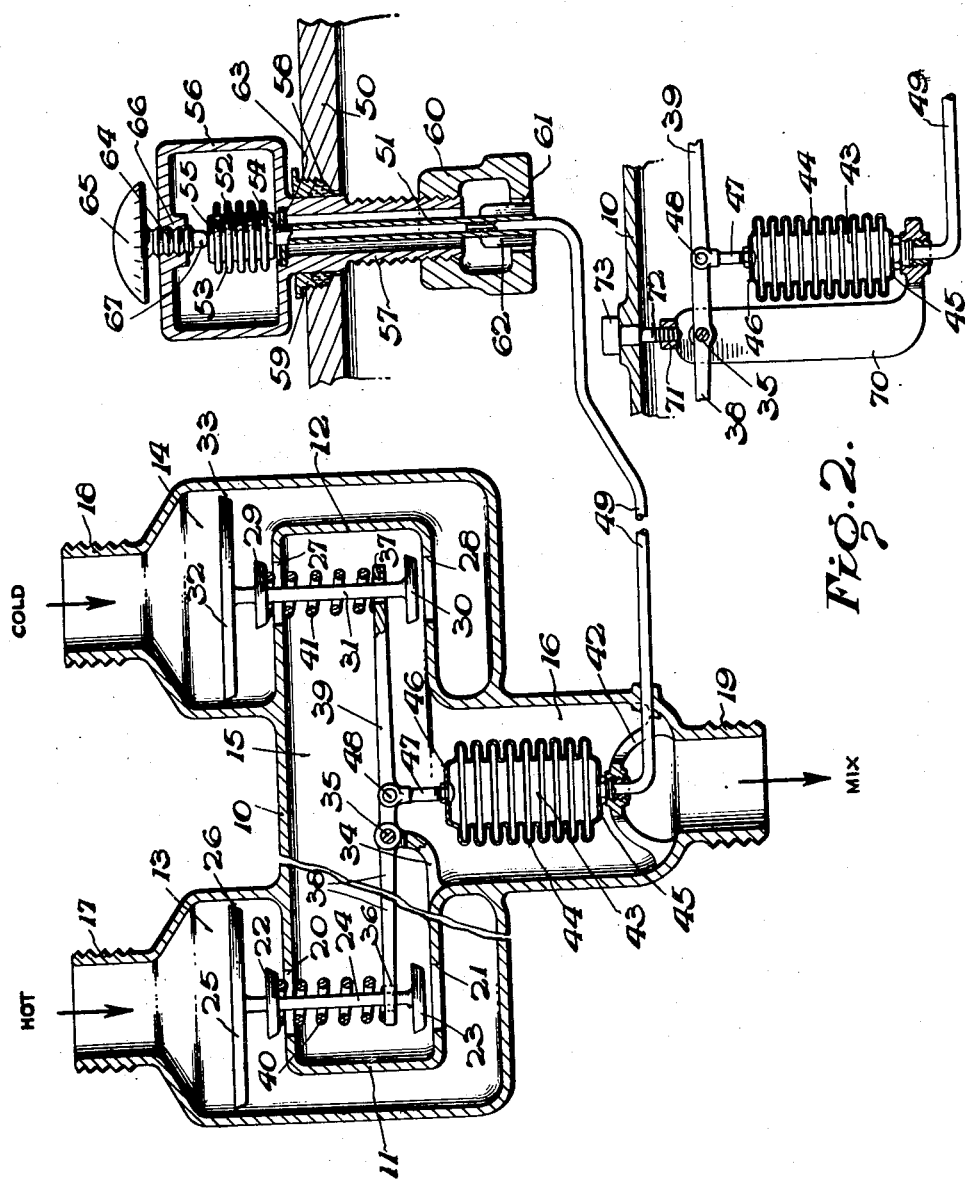

2,584,420

UNITED STATES PATENT OFFICE 2,584,420

MIXING VALVE

Charles D. Branson, Knoxville, Tenn., assignor to Robertshaw-Fulton Controls Company, Knoxville, Tenn., a corporation of Delaware Application October 4, 1948, Serial No. 52,688

16 Claims. (Cl. 236—12)

This invention relates to mixing valves and more particularly to mixing valves providing for a constant rate of flow of the mixed fluids.

It is an object of this invention to provide an improved mixing valve which assures a substantially constant rate of discharge of the mixed fluids notwithstanding variations in pressure in any or all of the incoming fluids to be mixed.

Another object of this invention is to provide an improved mixing valve as just characterized wherein the rate of discharge is maintained substantially constant notwithstanding any variations in back pressure in the discharge such as may arise, for example, from varying rates of consumption of the mixed fluids.

Another object of this invention is to provide an improved mixing valve which assures a substantially uniform temperature in the discharge by eliminating variations of temperature effect due to variations in supply pressure of one or more of the fluids to be mixed.

Another object of this invention is to provide an improved mixing valve which predetermines the temperature of the discharge by maintaining substantially constant rates of inflow of the fluids to be mixed and proportioning said rates of flow to attain the desired temperature of the discharge.

Another object of this invention is to provide an improved mixing valve of the type last characterized which may be thermostatically operated to predetermine the proportion of inflow of the hot and cold fluids.

Another object of this invention is to provide an improved mixing valve of the type last characterized wherein the temperature of the discharge may be readily adjusted.

Another object of this invention is to provide an improved mixing valve as heretofore characterized wherein the rate of discharge may be readily adjusted.

Another object of this invention is to provide an improved mixing valve which is composed of relatively simple parts that are simple and inexpensive to fabricate, easy to assemble, and highly efficient in operation.

Other objects of the invention will appear as the description of the invention proceeds.

The invention is capable of receiving a variety of mechanical expressions two of which are illustrated on the accompanying drawing but it is to be expressly understood that the drawing is for purposes of illustration only, and is not to be construed as a definition of the limits of the invention, reference being had to the appended claims for that purpose.

Referring in detail to the accompanying drawing wherein the same reference characters are employed to designate corresponding parts in the respective figures, Fig. 1 is a diagrammatic cross sectional elevation of an embodiment of the present invention; and Fig. 2 is a fragmentary view on a somewhat smaller scale of a portion of Fig. 1 to illustrate a suitable provision for adjusting the rate of flow of the mixed fluids.

Referring first to Fig. 1, 10 designates a valve housing of any suitable size, construction and material having interiorly thereof suitable partitions 11 and 12 so as to subdivide the interior of said housing into a hot water chamber 13, a cold water chamber 14 and a mixing chamber 15. As shown, mixing chamber 15 has a tubular extension 16 for a purpose to be explained. As diagrammatically illustrated, hot water chamber 13 has in communication therewith a threaded nipple 17 or other suitable provision for connection with any suitable source of hot water, and similarly cold water chamber 14 has in communication therewith a threaded nipple 18 or other suitable provision for connection with any suitable source of cold water. Communicating with the mixing chamber 15, and preferably with the tubular extension 16 thereof, is also a threaded nipple 19 or other suitable provision for connection with any suitable conduit to convey the mixed fluid to any suitable place of consumption.

Partition 11, as illustrated, is provided with a pair of aligned valve ports 20 and 21 of equal area providing communication between the hot water chamber 13 and the mixing chamber 15, said ports here being shown as apertures in partition 11, but any suitable valve seat members may be associated therewith if preferred. Cooperating with said ports 20 and 21 are a pair of valve disks 22 and 23 of any suitable construction connected by a suitable valve stem 24, said valve members 22 and 23 being of equal effective area so as to provide a balanced valve action as will hereinafter appear. Also mounted on said stem 24 in the chamber 13 is a disk 25 of such configuration and area that it provides by means of its clearance 26 between its periphery and the wall of the chamber 13 an orifice of predetermined area for a reason to be explained.

Similarly, partition 12 is provided with a pair of aligned ports 27 and 28 of equal area, shown as apertures in said partition but valve seat members may be employed if preferred, with which cooperate a pair of valve members 29 and 30 of any suitable construction connected by a suitable stem 31, said valve members 29 and 30 being of equal effective area. Also mounted on the stem 31 in the chamber 14 is a disk 32 of such configuration and area that it provides by means of its clearance 33 between its periphery and the wall of the chamber 14 an orifice of predetermined area.

Mounted in any suitable way in the mixing chamber 15, as by a bracket 34, is a lever composed of arms of equal length, said lever being pivoted on the bracket at 35 and having apertures or slots 36 and 37 at the opposite extremities of its lever arms 38 and 39 so as to embrace or receive the valve stems 24 and 31, respectively. Interposed between the lever arm 38 and the valve member 22 is a coil spring 40 in surrounding relationship to the valve stem 24 and similarly interposed between the lever arm 39 and the valve member 29 is a coil spring 41 in surrounding relationship to the valve stem 31. Springs 40 and 41 are of equal size so as to impose equal loads on their associated valve members and the disks connected thereto. As the lever arms 38 and 39 are of equal length movement of the lever 38, 39 about its fulcrum 35 will produce an equal increase in the tension of spring 40 and decrease in the tension of spring 41 or vice versa.

Lever 38, 39 is preferably operated thermostatically and to this end any suitable thermostat is appropriately mounted in the extension 16 of the mixing chamber 15 and operatively connected to said lever. As illustrated, a suitable bracket 42 is formed on or secured to the wall of the chamber extension 16 and mounted thereon is a thermostat 43 in the form of an expansible and collapsible chamber shown as having its peripheral wall formed by an expansible and collapsible corrugated tubular wall or bellows 44. Thermostat chamber 43 at one end has formed integrally with the bellows or hermetically sealed thereto a stationary end wall 45 fixedly secured in position on the bracket 42 in any suitable way. The opposite end of said chamber 43 has integrally formed with the bellows or hermetically sealed thereto a movable end wall 46 to which is secured a post 47 pivotally connected to the lever 38, 39 at any suitable point 48. Thermostat chamber 43 is charged with any suitable thermosensitive fluid so as to constitute a thermostat for operation of the lever 38, 39 in a manner to be explained.

Thermostat 43 is preferably made adjustable so as to vary the temperature of the mixed fluid. To this end, as shown, a conduit 49, of any suitable size, construction and material and which may be rigid or flexible, communicates with the thermostat chamber 43 through an aperture in its end wall 45 and leads to an adjusting mechanism which may be disposed on any suitable member 50 at any appropriate distance away. As illustrated, conduit 49 is hermetically sealed into a tube 51 which in turn is in communication with an expansible and collapsible chamber 52 having its peripheral wall formed by an expansible and collapsible corrugated tubular wall or bellows 53 having a stationary end wall 54 and a movable end wall 55 at least one of which may be integrally formed with the bellows, or both of said end walls may be hermetically sealed to the bellows. Tube 51 communicates with the interior of said chamber 52 through a suitable aperture in its end wall 54. Surrounding said chamber 52 is a bracket or housing 56 having a tubular threaded shank 57 projecting through an aperture 58 in member 50 in which it is mounted in any suitable way as by a ring nut 59. Threadedly mounted on the end of the shank 57 is a hollow block 60 provided with a splined opening 61 into which the tube 51 projects, tube 51 being provided with external splines 62 for cooperation with the splines in the opening 61 so as to prevent relative rotation between the tube 51 and shank 57. Collapsible chamber 52 is mounted in the bracket or housing 56 in any suitable way as by a plate 63, and mounted in the wall of said bracket or housing 56 is a device for contracting and expanding said chamber 52, here shown as a member comprising a threaded shank 64 having a suitable button or handwheel 65 for rotating said shank in the threaded aperture 66 provided in the wall of the bracket or housing 56. Shank 64 terminates in an end 67 adapted to engage the movable end wall 55 of said expansible and collapsible chamber 52. By rotating the handwheel 65 in one direction or the other the shank 64 may be moved into or out of the opening 66, compressing or expanding said chamber 52. Chamber 52, tube 51 and conduit 49 are charged with the same thermosensitive fluid as the thermostat 43, and therefore by compressing or expanding the chamber 52 the chamber 43 may be expanded or contracted to vary the thermostatic action thereof on the lever 38, 39 as will appear from the ensuing description.

As will appear more clearly hereinafter the construction so far described will effect a substantially constant outflow of the mixture of fluids through the outlet nipple 19, the provision for adjustment above described constituting a provision for varying the proportion of the incoming liquids but maintaining a substantially constant discharge. If it is desired to also include a provision for varying the rate of discharge or outflow of the mixture, the provision diagrammatically illustrated in Fig. 2 may be used, parts therein shown corresponding to parts already described in conjunction with Fig. 1 being given the same reference characters. As here illustrated, instead of mounting the thermostat 43 fixedly on a bracket carried by the housing 10, said thermostat 43 is secured to an adjustable bracket 70 of any suitable construction to which the lever 38, 39 is also fulcrumed at 35. As illustrated, the bracket 70 is shown as threadedly mounted at 71 on a threaded shank 72 projecting through the wall of the housing 10 and having exteriorly thereof a suitable button or handwheel 73 for rotating the same, so that by rotating said shank 72 in one direction or the other the bracket 70 may be moved upwardly or downwardly as viewed in Fig. 2 and thereby variably position the lever 38, 39 to add or subtract equal increments of load to or from the springs 40 and 41.

It is a known law of hydrodynamics that a constant flow of fluid is obtained through an orifice of known area if a constant difference of pressure is maintained between the pressures at the inlet and outlet ends of said orifice. Advantage is taken of this law to maintain a constant flow of fluid through each of the inlet chambers 13 and 14. As both the hot and cold water valves are constant flow valves operating in the same way and preferably of identical construction, it will be sufficient to describe the operation of one of them.

Taking the hot water valve mechanism by way of illustration, an orifice of predetermined area is provided by the clearance at 26 as heretofore pointed out. Therefore, a constant inflow of hot water through the orifice 26 can be maintained by maintaining a constant difference in pressure between the pressures at the upper and lower faces of the disk 25 as viewed in the drawings. For the disk 25 to be balanced the total pressure on the two faces thereof must be equal, and therefore the pressure of the hot water entering the chamber 13 multiplied by the area of the disk 25 at its upper face as viewed in the drawings must equal the pressure of the water in the space at the opposite face of the disk 25 multiplied by the area of the under face of the disk 25 as viewed in the drawings plus the pressure due to the tension of the spring 40. Otherwise expressed algebraically, the drop in pressure through the orifice 26 is equal to pressure on the disk due to the tension of the spring 40, i. e., the load on that spring.

If the pressure of the water on the upper face of the disk 25 increases, disk 25 is moved downwardly as viewed in the drawing to cause the valve members 22 and 23 to approach their ports 20 and 21 respectively and thereby, by restriction of flow through said ports, to increase the back pressure acting on the under face of the disk 25 until the difference of total pressure at the two faces is equal to the tension or load of the spring 40. Conversely, if the pressure on the upper face of the disk 25 decreases said disk moves upwardly to increase the flow through the ports 20 and 21, decreasing the pressure on the under face of the disk 25 by release of back pressure until the difference of total pressure at the two faces is equal to the tension or load of the spring 40. As the inner faces of the valve members 22 and 23 are subjected to the pressure in the mixing chamber and they are of equal area, any fluctuations of pressure in the mixing chamber are balanced out without effecting the rate of flow through the orifice 26. Thereby the rate of flow of the hot water through the hot water chamber to the mixing chamber is maintained substantially constant by maintaining a substantially constant pressure differential across the orifice 26, said pressure differential being predetermined by the load on the spring 40.

As will now be apparent, a substantially constant flow of hot water and a substantially constant flow of cold water to the mixing chamber 15 is maintained, and therefore the outflow or discharge from said mixing chamber will be substantially constant. This constant flow of discharge will therefore be maintained irrespective of fluctuations in pressure in either or both of the incoming fluids or fluctuations in the back pressure on the mixture. Furthermore, as long as the temperatures of the hot water and the cold water remain substantially the same the temperature of the mixture will remain substantially constant, the temperature of the mixture not being subject to variable pressure effects due to changes in pressure of the incoming liquids.

As before pointed out, the magnitude of the differential pressure across each orifice is equal to the tension or load of the spring associated with the disk that provides the orifice. Therefore, by changing the tension or load of a spring the rate of constant flow through the associated orifice can also be varied. Referring now to the action of the thermostat on the constant flow valves above discharged, if the temperature of the mixture flowing through the chamber extension 16 increases the thermostat 43 expands to move the lever 38, 39 around its fulcrum 35. As the lever arms are equal this means that an increment of load will be imposed on the spring 41 and an equal increment of load will be withdrawn from the spring 40. Thereby the pressure differentials across the orifices 26 and 33 will be respectively increased and decreased so as to increase the constant rate of flow of cold water and decrease the constant rate of flow of the hot water to such an amount as may be necessary to restore the temperature of the mixture to the desired degree.

It will be observed that the thermostat does not operate on either of the valve mechanisms directly, but operates to vary the loads of the two springs which determine the magnitude of the pressure differentials across the orifices 26 and 33. As the increment of load added to the spring 41 and the increment of load withdrawn from the spring 40 in the example selected are equal because of the equality of the lever arms 38 and 39, the increase of inflow of the cold water is substantially offset by the decrease in the inflow of hot water, both rates of flow being maintained substantially constant as before explained. Thereby the total outflow remains substantially constant even though the proportion of hot and cold water is changed. However, by mounting the lever on an adjustable support as in the embodiment of Fig. 2 so that equal increments of load may be added to or withdrawn from both springs, the total rate of discharge may be varied as will now be apparent to those skilled in the art.

While the thermostatic operation of the lever 38, 39 will maintain a substantially uniform temperature of discharge without varying the substantially constant rate of discharge as before explained, the temperature of the discharge may be varied by varying the proportion of hot to cold water delivered to the mixing chamber. By adjustment of the threaded shank 64, as before explained, the expansible and collapsible chamber 52 may be contracted or expanded to effect an adjustment of the thermostat 43 so as to predeterminately add to the load of one of the springs and withdraw an equal load from the other of the springs. As this varies the proportion of hot and cold water flowing into the mixing chamber, the temperature of the mixture will be correspondingly adjusted, but as the rate of flow through both orifices will be maintained substantially constant in conformity with the principles above explained and as the adjustment of the lever 38, 39 decreases inflow of one liquid by substantially the same amount as inflow of the other liquid is increased, the rate of discharge remains substantially constant and therefore unaffected by the temperature adjustment.

It will therefore be perceived that by the present invention an improved mixing valve has been provided which utilizes a substantially constant flow of each of the fluids to be mixed so that a substantially constant rate of discharge is obtained irrespective of fluctuations in pressure in any or all of the inflowing liquids or in the back pressure. At the same time, the proportion of flow of the incoming fluids can be varied thermostatically so as to obtain a substantially uniform temperature in the discharge, which may be varied manually to modify the temperature of the discharge, without varying the rate of discharge. However, by utilizing the provision diagrammatically indicated in Fig. 2 the rate of discharge can also be predetermined.

Thereby, under the hydrostatic principles herein utilized, substantially constant rates of inflow of liquid to be mixed may be used to maintain a substantially constant rate of discharge, and the temperature of the discharge may be thermostatically maintained at adjustable temperatures without substantially changing the rate of discharge. At the same time the use of the foregoing principles enables the valve mechanism to be constructed of simple parts that are inexpensive to manufacture and easy to assemble, and as the rates of flow are predetermined and maintained by maintaining predetermined pressure differentials across orifices of known area the mixing valve functions with high efficiency to maintain the desired rate of fluid flow and the desired temperature.

While the preferred embodiment utilizes a thermostatic adjustment of the lever 38, 39 such may be unnecessary where the temperatures of the inflowing liquids remain substantially constant or are otherwise controlled. While provisions have been made for adjusting the thermostat and adjusting the loads on the springs, such provisions may be omitted if desired without departing from the basic aspects of the present invention.

While the embodiments of the invention illustrated on the drawings have been described with considerable particularity, it is to be expressly understood that the invention is not limited thereto, as the same is capable of receiving a variety of expressions, as will now be apparent to those skilled in the art, while changes may be made in the details of construction, arrangement, size, proportion, etc., of the parts, and parts may be replaced by equivalent parts, without departing from the spirit of this invention. Reference is therefore to be had to the claims hereto appended for a definition of the limits of the invention.

What is claimed is:

1. In a mixing valve, in combination with a housing providing a plurality of fluid inlet chambers and a mixing chamber, a valve mechanism associated with each inlet chamber for controlling the flow of fluid therefrom to said mixing chamber, a disk operatively connected to each valve mechanism and disposed in the associated inlet chamber, said disk providing an orifice of predetermined area, a spring associated with each valve mechanism and its disk for predetermining the pressure drop through the associated orifice, and a lever fulcrumed in said mixing chamber and cooperating with said springs to add increments of load to one of said springs or subtract increments of load from the other of said springs.

2. In a mixing valve, in combination with a housing providing a plurality of fluid inlet chambers and a mixing chamber, a valve mechanism associated with each inlet chamber for controlling the flow of fluid therefrom to said mixing chamber, a disk operatively connected to each valve mechanism and disposed in the associated inlet chamber, said disk providing an orifice of predetermined area, a spring associated with each valve mechanism and its disk for predetermining the pressure drop through the associated orifice, a lever fulcrumed in said mixing chamber and cooperating with said springs to add increments of load to one of said springs and subtract increments of load from the other of said springs, and a thermostat operatively connected to said lever for actuating the same and subjected to the temperature of the liquid in said mixing chamber.

3. In a mixing valve, in combination with a housing providing a plurality of fluid inlet chambers and a mixing chamber, a valve mechanism associated with each inlet chamber for controlling the flow of fluid therefrom to said mixing chamber, a disk operatively connected to each valve mechanism and disposed in the associated inlet chamber, said disk providing an orifice of predetermined area, a spring associated with each valve mechanism and its disk for predetermining the pressure drop through the associated orifice, a lever fulcrumed in said mixing chamber and cooperating with said springs to add increments of load to one of said springs and subtract increments of load from the other of said springs, a thermostat operatively connected to said lever for actuating the same and subjected to the temperature of the liquid in said mixing chamber, and means associated with said thermostat for adjusting the same to proportion the loads of the two springs and thereby predetermine the relative rates of flow of fluids to said mixing chamber.

4. In a mixing valve, in combination with a housing providing a plurality of fluid inlet chambers and a mixing chamber, a valve mechanism associated with each inlet chamber for controlling the flow of fluid therefrom to said mixing chamber, a disk operatively connected to each valve mechanism and disposed in the associated inlet chamber, said disk providing an orifice of predetermined area, a spring associated with each valve mechanism and its disk for predetermining the pressure drop through the associated orifice, a lever fulcrumed in said mixing chamber and cooperating with said springs to add increments of load to one of said springs and subtract increments of load from the other of said springs, and an adjustable support on which said lever is fulcrumed for moving said lever to add or subtract increments of load to or from both springs simultaneously.

5. In a mixing valve, in combination with a housing providing a hot water inlet chamber, a cold water inlet chamber and a mixing chamber, a valve mechanism associated with each of said inlet chambers for controlling the flow of water therefrom to said mixing chamber, means cooperating with each of said valve mechanisms and disposed in the associated inlet chamber for actuating the associated valve mechanism and maintaining a constant flow of each liquid from its inlet chamber to said mixing chamber, and means for simultaneously adjusting both valve mechanisms to increase the rate of liquid flow past one of said valve mechanisms and decrease by a substantially equal amount the flow of liquid past the other of said valve mechanisms to vary the temperature without substantially varying the rate of discharge from said mixing chamber.

6. In a mixing valve, in combination with a housing providing a plurality of inlet chambers and a mixing chamber, valve mechanism associated with each inlet chamber for controlling the flow of fluid therefrom into the mixing chamber, a member operatively connected to each valve mechanism and disposed in the associated inlet chamber, each member providing an orifice of predetermined area, a spring associated with each valve mechanism and its member for predetermining the pressure drop across the associated orifice, and means for adjusting said springs to proportion the flow of fluid past the respective valve mechanisms into the mixing chamber.

7. In a mixing valve, in combination with a housing providing a plurality of inlet chambers and a mixing chamber, valve mechanism associated with each inlet chamber for controlling the flow of fluid therefrom into the mixing chamber, a member operatively connected to each valve mechanism and disposed in the associated inlet chamber, each member providing an orifice of predetermined area, a spring associated with each valve mechanism and its member for predetermining the pressure drop across the associated orifice, and means for adjusting said springs to proportion the flow of fluid past the respective valve mechanisms into the mixing chamber, said last named means cooperating with the respective valve mechanisms and disks to decrease the fluid flow past one of said valve mechanisms and increase the fluid flow past the other of said valve mechanisms by substantially equal amounts to maintain the rate of discharge substantially constant.

8. In a mixing valve, in combination with a housing providing a plurality of inlet chambers and a mixing chamber, valve mechanism associated with each inlet chamber for controlling the flow of fluid into the mixing chamber, a member operatively connected to each valve mechanism and disposed in the associated inlet chamber, each member providing an orifice of predetermined area, a spring associated with each valve mechanism and its member for predetermining the pressure drop across the associated orifice, means for adjusting said springs to proportion the flow of fluid past the respective valve mechanisms into the mixing chamber, and a lever fulcrumed in said mixing chamber and having arms cooperating with said springs to vary the load on said springs.

9. In a mixing valve, in combination with a housing providing a plurality of inlet chambers and a mixing chamber, valve mechanism associated with each inlet chamber for controlling the flow of fluid into the mixing chamber, a member operatively connected to each valve mechanism and disposed in the associated inlet chamber, each member providing an orifice of predetermined area, a spring associated with each valve mechanism and its member for predetermining the pressure drop across the associated orifice, means for adjusting said springs to proportion the flow of fluid past the respective valve mechanisms into the mixing chamber including a lever fulcrumed in said mixing chamber and having equal arms cooperating with said springs to increase the load on one spring by amounts substantially equal to the decrease of load on the other spring when said lever is moved about its fulcrum, and means for adjusting the fulcrum of said lever to vary the load on said springs.

10. In a mixing valve, in combination with a housing providing a plurality of inlet chambers and a mixing chamber, valve mechanism associated with each inlet chamber for controlling the flow of fluid into the mixing chamber, a member operatively connected to each valve mechanism and disposed in the associated inlet chamber, each member providing an orifice of predetermined area, a spring associated with each valve mechanism and its member for predetermining the pressure drop across the associated orifice, means for adjusting said springs to proportion the flow of fluid past the respective valve mechanisms into the mixing chamber including a lever fulcrumed in said mixing chamber and having arms cooperating with said springs to vary the load on said springs, and a thermostat operatively connected to said lever and subjected to the temperature in said mixing chamber and operable to vary the load on said springs to vary the proportion of fluid flowing past said valve mechanisms.

11. In a mixing valve, in combination with a housing having internal partitions subdividing the interior of said housing into a plurality of inlet chambers and a mixing chamber, a pair of aligned ports of equal area in each of said partitions, a pair of balanced valve members associated with each pair of ports, a disk operatively connected to each pair of balanced valves and disposed in the associated inlet chamber, each of said disks providing between its periphery and the wall of its chamber an orifice of predetermined area, a spring associated with each pair of balanced valves and its disk for predetermining the pressure drop across the associated orifice, and means for predetermining the load on each spring to proportion the rate of flow of fluid past each valve mechanism into said mixing chamber.

12. In a mixing valve, in combination with a housing having internal partitions subdividing the interior of said housing into a plurality of inlet chambers and a mixing chamber, a pair of aligned ports of equal area in each of said partitions, a pair of balanced valve members associated with each pair of ports, a disk operatively connected to each pair of balanced valves and disposed in the associated inlet chamber, each of said disks providing between its periphery and the wall of its chamber an orifice of predetermined area, a spring associated with each pair of balanced valves and its disk for predetermining the pressure drop across the associated orifice, and means for predetermining the load on each spring to proportion the rate of flow of fluid past each valve mechanism into said mixing chamber, said balanced valves having opposed surfaces of equal effective area subjected to the pressure in said mixing chamber whereby each valve mechanism is independent of variations in the back pressure in said mixing chamber.

13. In a mixing valve, in combination with a housing having internal partitions subdividing the interior of said housing into a plurality of inlet chambers and a mixing chamber, a pair of aligned ports of equal area in each of said partitions, a pair of balanced valve members associated with each pair of ports, a disk operatively connected to each pair of balanced valves and disposed in the associated inlet chamber, each of said disks providing between its periphery and the wall of its chamber an orifice of predetermined area, a spring associated with each pair of balanced valves and its disk for predetermining the pressure drop across the associated orifice, means for predetermining the load on each spring to proportion the rate of flow of fluid past each valve mechanism into said mixing chamber, and a lever fulcrumed in said mixing chamber and having its opposite extremities in cooperative relationship with said springs to decrease the load on one of said springs when the load on the other of said springs is increased.

14. In a mixing valve, in combination with a housing having internal partitions subdividing the interior of said housing into a plurality of inlet chambers and a mixing chamber, a pair of aligned ports of equal area in each of said partitions, a pair of balanced valve members associated with each pair of ports, a disk operatively connected to each pair of balanced valves and disposed in the associated inlet chamber, each of said disks providing between its periphery and the wall of its chamber an orifice of predetermined area, a spring associated with each pair of balanced valves and its disk for predetermining the pressure drop across the associated orifice, means for predetermining the load on each spring, and a thermostat operatively connected to said means to vary the proportion of fluid flowing past the respective valve mechanisms by simultaneously varying the loads on the respective springs.

15. In a mixing valve, in combination with a housing having internal partitions subdividing the interior of said housing into a plurality of inlet chambers and a mixing chamber, a pair of aligned ports of equal area in each of said partitions, a pair of balanced valve members associated with each pair of ports, a disk operatively connected to each pair of balanced valves and disposed in the associated inlet chamber, each of said disks providing between its periphery and the wall of its chamber an orifice of predetermined area, a spring associated with each pair of balanced valves and its disk for predetermining the pressure drop across the associated orifice, a lever for predetermining the load on each spring to proportion the rate of flow of fluid past each valve mechanism into said mixing chamber, and manually operable means for varying the position of said lever to vary the loads on said springs and thereby proportion the rates of flow of fluid past their respective valve mechanism.

16. In a mixing valve, in combination with a housing having internal partitions subdividing the interior of said housing into a plurality of inlet chambers and a mixing chamber, a pair of aligned ports of equal area in each of said partitions, a pair of balanced valve members associated with each pair of ports, a disk operatively connected to each pair of balanced valves and disposed in the associated inlet chamber, each of said disks providing between its periphery and the wall of its chamber an orifice of predetermined area, a spring associated with each pair of balanced valves and its disk for predetermining the pressure drop across the associated orifice, a lever for predetermining the load on each spring to proportion the rate of flow of fluid past each valve mechanism into said mixing chamber, and adjustable means on which said lever is fulcrumed for moving said lever to add or subtract equal increments of load to each of said springs.

CHARLES D. BRANSON.

REFERENCES CITED

The following references are of record in the file of this patent:

UNITED STATES PATENTS

| Number | Name | Date |
|---|---|---|
| 209,021 | Chamberlain | Oct. 15, 1878 |
| 1,153,547 | Finney | Sept. 14, 1915 |
| 2,321,573 | Chace | June 15, 1943 |
| 2,453,409 | Chace | Nov. 9, 1948 |